United States Patent Office 3,056,780
Patented Oct. 2, 1962

3,056,780
3-SULFANILAMIDO-4-SUBSTITUTED TRIAZOLES
Frederick A. Grunwald and William B. Lacefield, Evansville, Ind., assignors to Mead Johnson & Company, Evansville, Ind., a corporation of Indiana
No Drawing. Filed June 5, 1961, Ser. No. 114,628
9 Claims. (Cl. 260—239.75)

This invention relates to 3-sulfanilamido-4-substituted triazoles and processes for their production, and more particularly, to compounds having the structural formula:

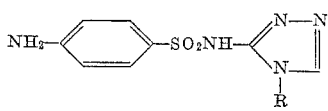

wherein R is selected from the group consisting of phenyl; lower alkoxyphenyl, such as methoxy-, ethoxy-, dimethoxy-, diethoxy-, or dipropoxyphenyl; pyridyl; lower alkyl pyridyl, such as methyl-, ethyl-, or propyl-, or dimethylpyridyl; and pyrimidyl.

The compounds of this invention are useful as antibacterial agents in mammals. As sulfa drugs they may be used in the same manner as other members of the class. They are characterized by low toxicities and provide effective blood concentrations in animals of intermediate duration on oral administration thereto. They are administered orally as tablets or liquid pharmaceutical dosage forms twice daily in doses totalling 30 to 350 mg./kg. of body weight per day. They may also be administered parenterally.

The present compounds are prepared by the condensation of a 3-amino-4-substituted-1,2,4-triazole with an N-acetylsulfanilyl halide to produce a 3-($N^4$-acetylsulfanilamido)-4-substituted 1,2,4-triazole product which is subsequently hydrolyzed to give the desired 3-sulfanilamido-4-substituted-1,2,4-triazole, according to the following equations:

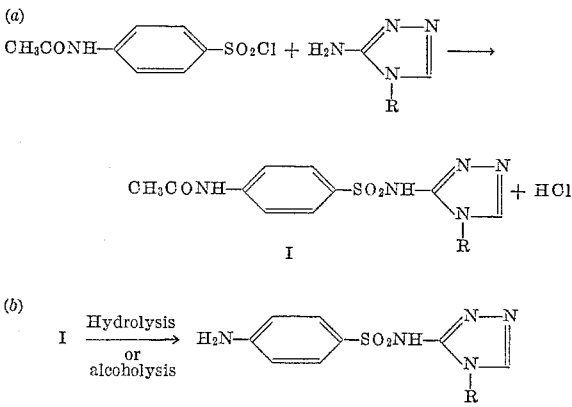

wherein R is as previously defined.

The condensation reaction illustrated in Equation a may be carried out in a solvent under substantially anhydrous conditions. Preferred solvents are those which will react with the hydrohalide produced in the reaction, such as, for example, pyridine. The deacetylation step illustrated in Equation b may be carried out by hydrolysis in aqueous solutions of mineral acids including hydrochloric and sulfuric acids, or of strong bases such as sodium hydroxide, calcium hydroxide, or potassium hydroxide, or if desired, may be carried out by alcoholysis using acidic alcoholic solutions such as ethanolic HCl.

The intermediate 3-amino-4-substituted-1,2,4-triazoles are prepared by the method described by Raison, J. Chem. Soc., 2858 (1957). That general method discloses the production of 3-amino-4-phenyl-1,2,4-triazole by a series of steps starting with the reaction of aniline with ethyl orthoformate to produce ethyl-N-phenyl formimidate. This intermediate is reacted with thiosemicarbazide to produce phenyl-N'-thioureidoformamidine which is subsequently cyclized to produce the desired 3-amino-4-phenyl-1,2,4-triazole. Similar compounds containing substituents other than phenyl in the 4-position may be prepared from starting materials other than aniline. For example, 2,5-dimethoxyaniline may be used in place of aniline to produce the 3-amino-4-(2,5-dimethoxyphenyl)-1,2,4-triazole. Other starting materials may likewise be used to introduce the desired R group in the 4-position of the 4-substituted-1,2,4-triazoles described above.

For a more complete understanding of this invention, the following examples are provided:

EXAMPLE I

*3-Sulfanilamido-4-Phenyl-1,2,4-Triazole*

Two and seventh-tenths grams (0.0168 mole) of 3-amino-4-phenyl-1,2,4-triazole (Raison, J. Chem. Soc., 2858 [1957]) in 75 ml. of anhydrous pyridine contained in a 250 ml. three-necked flask (fitted with a stirrer, thermometer, reflux condenser, calcium chloride drying tube, and a heating mantle) is treated while stirring at room temperature with 4.11 g. (0.0176 mole) of N-acetyl, sulfanilyl chloride added portion-wise over a period of 15–20 minutes. The reaction mixture is stirred at room temperature for 15 minutes, heated at 60–65° C. for 2.5 hours, and refluxed for 1 hour.

Most of the pyridine is removed under reduced pressure and two 100 ml. portions of water are added and distilled from the residue to complete the removal of the pyridine. The aqueous residue (volume about 15 ml.) is chilled at 4° C. for 2 hours and filtered, giving 3-($N^4$-acetylsulfanilamido)-4-phenyl-1,2,4-triazole, a yellow solid having a melting point of 252–5° C. The 3-($N^4$-acetylsulfanilamido)-4-phenyl-1,2,4-triazole (4.4 g., 0.0123 mole) is dissolved in 44 ml. of 2 N sodium hydroxide and heated on a steam bath for 2.5 hours, chilled, and neutralized with concentrated hydrochloric acid. After refrigeration at 0° C. for 30 minutes, filtration of the solution yields a crude solid product, M.P. 201–8° C. Two recrystallizations from absolute ethanol give 3-sulfanilamido-4-phenyl-1,2,4-triazole as colorless plates, M.P. 219–22° C.

EXAMPLE II

*3-Sulfanilamido-4-(2,5-Dimethoxyphenyl)-1,2,4-Triazole*

Seventy-five grams (0.295 mole) of N-(2,5-dimethoxyphenyl)-N'-thioureidoformamidine, M.P. 130–3° C. (prepared from 2,5-dimethoxyaniline by the method of Raison, supra), in 325 ml. of 2 N sodium hydroxide is placed in a 1 liter Erlenmeyer flask, and 37.2 grams (0.295 mole) of dimethylsulfate is added dropwise with stirring at 20° C. The reaction mixture is stirred at room temperature for 1.5 hours and heated at the boiling point for 2 hours, during which time three 100 ml. portions of water were added to maintain the volume.

The mixture is allowed to settle and the supernatant liquid is decanted from a considerable quantity of oily residue. The residue is re-suspended in 80 ml. of 2 N sodium hydroxide and boiled 30 minutes. Twenty-seven grams of sodium hydroxide in 35 ml. of water is then added and the boiling is continued for an additional 30 minutes; whereupon an additional 30 g. of sodium hydroxide in 30 ml. of water is added and the boiling is continued for another 30 minutes, so that the total boiling time is 1.5 hours. The oily suspension solidifies on cooling and is separated by filtration to give 35.7 g. of an off-white solid, M.P. 162° C. This material is combined with 4.7 g. of similar material obtained by chilling the original aqueous layer and the combination is recrystallized twice from 100 ml. of water. (It is necessary to decant the hot solution from 5–10 g. of a red oil on the first recrystallization.) The product is an off-white solid, M.P. 154–185° C. Fractional recrystallization of this material from a mixture of chloroform and carbon tetrachloride yields 3-amino-4-(2,5-dimethoxyphenyl)-1,2,4-triazole, M.P. 198–202° C., and on further recrystallization from water, M.P. 200–202° C.

Eleven grams (0.05 mole) of 3-amino-4-(2,5-dimethoxyphenyl)-1,2,4-triazole is added to 250 ml. of anhydrous pyridine contained in a 500 ml. three-necked flask, fitted with a stirrer, heating mantle, thermometer, and condenser capped by a drying tube. The mixture is stirred and treated at room temperature with 12.8 g. (0.055 mole) of N-acetylsulfanilyl chloride added portionwise over a period of 3 to 5 minutes. The resulting solution is stirred at room temperature for 1 hour, heated to 60–65° C. for 2½ hours, and allowed to cool to 40–50° C. To the cooled solution there is added 250 ml. of water and the solution is concentrated in vacuo to a volume of 100 ml. Additional water (250 ml.) is added, followed by concentration in vacuo to 75 ml. Filtration after chilling yields crude 3-($N^4$-acetylsulfanilamido)-4-(2,5-dimethoxyphenyl)-1,2,4-triazole, a light yellow crystalline solid, M.P. 249–252° C. Recrystallization from 80% ethanol gives an off-white solid, M.P. 252–254° C.

Sixteen and one-tenth grams (0.0386 mole) of 3-($N^4$-acetylsulfanilamido) - 4 - (2,5 - dimethoxyphenyl)-1,2,4-triazole dissolved in 161 ml. of 2 N sodium hydroxide is heated on a steam bath for 1.5 hours, and refrigerated overnight at 4° C. Crude 3-sulfanilamido-4-(2,5-dimethoxyphenyl)-1,2,4-triazole sodium salt is recovered by filtration, dissolved in 100 ml. of water, neutralized with 1 N hydrochloric acid, and filtered to afford crude 3-sulfanilamido-4-(2,5-dimethoxy-phenyl)-1,2,4-triazole, M.P. 238–40° C. Three recrystallizations from methyl Cellosolve give 3-sulfanilamido-4-(2,5-dimethoxyphenyl)-1,2,4-triazole, M.P. 238–40° C.

EXAMPLE III

*3-Sulfanilamido-4-(2-Pyridyl)-1,2,4-Triazole*

One hundred eighteen grams (0.6 mole) of N-(2-pyridyl)-N'-thioureidoformamidine (prepared by the method of Raison, supra) in 600 ml. of 2 N sodium hydroxide at 20° C. is treated dropwise while stirring with 76.5 grams (0.6 mole) of dimethylsulfate. The addition requires 30 minutes. After completion, the reaction mixture is stirred for 15 minutes. The yellow S-methylthioureido intermediate is recovered by filtration, M.P. 115–20° C.

This intermediate is suspended in 500 ml. of 1 N sodium hydroxide and is then heated at the boiling point until solution occurs (ca. 1–2 minutes). The pale yellow solution is filtered hot and chilled to 10° C. The 3 - amino - 4 - (2 - pyridyl) - 1,2,4 - triazole is recovered from the chilled solution as snow-white needles, M.P. 221–6° C. Further purification by recrystallization from water gives white needles, M.P. 223–6° C.

Sixty-five grams (0.402 mole) of 3-amino-4-(2-pyridyl)-1,2,4-triazole in 1,150 ml. of anhydrous pyridine contained in a 2 liter three-necked flask (fitted with a magnetic stirrer, reflux condenser, drying tube, thermometer, and heating mantle) is treated at room temperature while stirring with 103.5 g. (0.444 mole) of N-acetylsulfanilyl chloride added portionwise over a period of 3–5 minutes. The reaction mixture is heated with stirring at 60–65° C. for 2.5 hours.

Most of the pyridine is removed under reduced pressure, 500 ml. of water is added, and the volume reduced to about 250 ml. by distillation in vacuo. The suspension is chilled in an ice bath to 0–5° C. and filtered, giving crude 3-($N^4$-acetylsulfanilamido)-4-(2-pyridyl)-1,2,4-triazole, M.P. 245–250° C. Recrystallization from methyl Cellosolve (activated charcoal) gives a pale yellow crystalline solid, M.P. 260–3° C.

Seventy-eight grams of 3-($N^4$-acetylsulfanilamido)-4-(2-pyridyl)-1,2,4-triazole (0.218 mole) dissolved in 780 ml. of 2 N sodium hydroxide is heated on a steam bath for 3 hours, chilled, and neutralized with concentrated hydrochloric acid. The resultant suspension of white solid is chilled for 20 minutes and filtered, giving crude 3 - sulfanilamido - 4 - (2 - pyridyl) - 1,2,4 - triazole, a white amorphous solid, M.P. 227–40° C. Three recrystallizations from 50% aqueous dimethylformamide yield colorless needles, M.P. 242–4° C.

EXAMPLE IV

*3-Sulfanilamido-4-(β-Pyridyl)-1,2,4-Triazole*

Nineteen and one-half grams (0.1 mole) of N-(β-pyridyl)-N'-thioureidoformamidine (prepared by the method of Raison, supra) is suspended in 112 ml. of water and treated with 113 ml. of cold 2 N sodium hydroxide while stirring. After 15 minutes, the mixture is chilled in an ice bath and treated dropwise over a period of 30 minutes with 12.6 grams (0.1 mole) of dimethylsulfate. After the addition is complete, the mixture is warmed to room temperature and stirred for 1.5 hours. The dark red reaction mixture is heated to boiling and at once quickly cooled to room temperature. Refrigeration overnight at 4° C. yields crude 3-amino-4-(β-pyridyl)-1,2,4-triazole, M.P. 217–21° C.

An additional 0.9 g. of 3-amino-4-(β-pyridyl)-1,2,4-triazole, M.P. 216–20° C., is obtained by evaporation of the filtrate under reduced pressure to one-half the original volume and refrigeration at 4° C., for 16 hours. Recrystallization from 40 ml. of water (activated charcoal) yields 7.2 g. of off-white crystals, M.P. 219–22° C.

Seven and two-tenths grams (0.0447 mole) of 3-amino-4-(β-pyridyl)-1,2,4-triazole in 250 ml. of anhydrous pyridine contained in a 500 ml. three-necked flask (fitted with a stirrer, thermometer, reflux condenser, drying tube, and heating mantle) is heated until complete solution occurs, solution temperature about 110–15° C. The solution is chilled to room temperature (a fine white precipitate separates at 80–85° C.) and treated while stirring with 11.5 g. (0.0492 mole) of N-acetylsulfanilyl chloride added portionwise over a period of 5–7 minutes. The mixture is stirred at room temperature for 30 minutes and heated at 60–65° C. for 3 hours.

The pyridine is removed by distillation under reduced pressure followed by distillation of four 200 ml. portions of water from the residue. The aqueous residue (volume about 25–50 ml.) is refrigerated at 4° C. for 1 hour and filtered, to yield the crude 3-($N^4$-acetylsulfanilamido)-4-(β-pyridyl)-1,2,4-triazole as a brown solid, M.P. 148–52° C. dec. Recrystallization from aqueous ethanol gives 7.8 g. of an off-white solid, M.P. 149–52° C. dec.

Five and three-quarters grams of 3-($N^4$-acetylsulfanilamido)-4-(β-pyridyl)-1,2,4-triazole (0.016 mole) is dissolved in 140 ml. of 1 N HCl and the solution is heated on a steam bath for 1 hour, chilled, neutralized with 2.5 N sodium hydroxide, chilled again, and filtered, giving 4.2 g. of crude 3-sulfanilamido-4-(β-pridyl)-1,2,4-triazole, an off-white amorphous solid. Two recrystallizations from 50% aqueous methyl cellosolve, yield colorless crystals, M.P. 290–2° C. dec.

EXAMPLE V

*3-Sulfanilamido-4-(γ-Pyridyl)-1,2,4-Triazole*

Nineteen and one-half grams (0.1 mole) of N-(γ-pyridyl)-N'-thioureidoformamidine (prepared by the method of Raison, supra) dissolved in 100 ml. of 2 N sodium hydroxide at 20° C. is treated dropwise while stirring with 12.6 g. (0.1 mole) of dimethylsulfate. The reaction mixture is allowed to warm to room temperature and stirred for 1 hour. Chilling to 0° C. and filtering yields 14.3 g. of the yellow S-methylthioureido intermediate, M.P. 143–5° C. This intermediate is suspended in 85 ml. of 1 N sodium hydroxide and heated on a steam bath until solution occurs. Chilling 45 minutes at 0° C. and filtering yields 10.5 g. (65%) of crude 3-amino-4-(γ-pyridyl)-1,2,4-triazole, M.P. 223–6° C. Recrystallization from water yields white crystals, M.P. 227–30° C.

Eight and one-tenth grams (0.0503 mole) of 3-amino-4-(γ-pyridyl)-1,2,4-triazole in 250 ml. of anhydrous pyridine contained in a 500 ml. three-necked flask (fitted with a stirrer, reflux condenser, drying tube, thermometer, and heating mantle) is treated at room temperature while stirring with 12.9 g. (0.0554 mole) of N-acetylsulfanilyl chloride added portionwise over a period of 3–5 minutes. Cooling is necessary to maintain the temperature below 30° C. during the addition. The reaction mixture is stirred at room temperature for 1 hour, heated to 105° C. (to complete solution), cooled to 75–80° C., and maintained at that temperature for 1.5 hours.

The cooled reaction mixture is diluted with an equal volume of water and concentrated under reduced pressure. Two 100 ml. portions of water are distilled from the residue to complete the removal of pyridine. The aqueous residue (volume about 75–100 ml.) is refrigerated at 4° C. for 30 minutes and filtered. The crude 3-($N^4$-acetylsulfanilamido-4-(γ-pyridyl)-1,2,4 - triazole, on recrystallization from dimethylformamide (activated charcoal), yields 8.2 g. of a pale yellow solid, M.P. 302–4° C.

Eight and one-tenth grams (0.0225 mole) of 3-($N^4$-acetylsulfanilamido)-4-(γ-pyridyl)-1,2,4-triazole in 81 ml. of 2 N sodium hydroxide is heated on a steam bath for 1 hour and neutralized with 1 N hydrochloric acid at 60–70° C. Refrigeration of the resultant yellow precipitated at 4° C. for 2 hours and filtration yields 7.2 g. of crude 3-sulfanilamido-4-(γ-pyridyl)-1,2,4-triazole, a yellow amorphous solid, M.P. 245–9° C. Two recrystallizations from glacial acetic acid and two from aqueous dimethylformamide yield soft, slightly yellow leaflets, M.P. 267–70° C.

EXAMPLE VI

*3-Sulfanilamido-4-(5-Methyl-2-Pyridyl)-1,2,4-Triazole*

Forty-five grams (0.215 mole) of N-(5-methyl-2-pyridyl)-N'-thioureidoformamide (prepared by the method of Raison, supra) is dissolved in 215 ml. of 2 N sodium hydroxide contained in a 1 l. Erlenmeyer flask (equipped with a stirrer and an ice bath) and treated at 20° C. while stirring with 27.1 g. (0.215 mole) of dimethylsulfate at such a rate that the reaction temperature does not exceed 20° C. The resulting suspension is stirred at room temperature for 45 minutes and filtered. About 40 g. of the moist yellow S-methylthioureido intermediate, M.P. 90–100° C. dec., is obtained. The intermediate is suspended in 400 ml. of 1 N sodium hydroxide and heated at the boiling point until solution occurs, the addition of 250 ml. of water being necessary to completely dissolve the material.

After cooling to room temperature and refrigerating at 4° C. for 2 hours, filtration yields 20 g. (53%) of 3-amino-4-(5-methyl-2-pyridyl)-1,2,4-triazole which, on recrystallization from water containing 5% ethanol is obtained as white needles, M.P. 258–60° C.

Fifteen and one-tenth grams (0.0865 mole) of 3-amino-4-(5-methyl-2-pyridyl)-1,2,4-triazole is suspended in 265 ml. of anhydrous pyridine contained in a 500 ml. three-necked flask (fitted with a stirrer, heating mantle, thermometer, reflux condenser, drying tube and stopper) and treated at room temperature while stirring with 22.1 g. (0.095 mole) of N-acetylsulfanilyl chloride which is added portionwise over a period of 3.5 minutes. The reaction mixture is stirred for an additional 5 minutes at room temperature and then heated at 60–65° C. for 2 hours. Most of the pyridine is removed by evaporation under reduced pressure, the last traces being removed by adding 200 ml. of water to the residue and concentrating to 100 ml. by vacuum distillation. Refrigeration for 1 hour at 4° C. and filtration yields crude 3-($N^4$-acetylsulfanilamido)-4-(5-methyl-2-pyridyl)-1,2,4-triazole, which, on recrystallization from a mixture of 225 ml. of dimethylformamide and 100 ml. of water yields 18.5 g. of a pale yellow crystalline solid, M.P. 282–6° C.

Eighteen and one-half grams (0.05 mole) of 3-($N^{4'}$-acetylsulfanilamido) - 4 - (5 - methyl - 2 - pyridyl) - 1,2,4-triazole in 180 ml. of 2 N sodium hydroxide is heated on a steam bath for 2.5 hours, chilled in an ice bath to 10–15° C., and neutralized, while stirring, with concentrated hydrochloric acid. The suspension of white solid is refrigerated overnight at 4° C., filtered, and the cake dried. The yield is 16.3 g. (98.5%) of 3-sulfanilamido-4-(5-methyl-2-pyridyl)-1,2,4-triazole, M.P. 236–41° C. Three recrystallizations from 50% aqueous dimethylformamide yields 11.5 g. of colorless needles, M.P. 254–5.5° C.

EXAMPLE VII

*3-Sulfanilamido-4-(2-Pyrimidyl)-1,2,4-Triazole*

To a solution of 16.5 g. (0.084 mole) of N-(2-pyrimidyl)-N'-thioureidoformamidine (prepared by the method of Raison, supra) in 84 ml. of 2 N sodium hydroxide stirred in a 250 ml. Erlenmeyer flask, there is added dropwise, while maintaining a temperature of 15–20° C., 10.6 g. (0.084 mole) of dimethyl sulfate. The addition requires about 1 hour, during which time a yellow precipitate separates. Stirring is continued at about 15° C. for 30 minutes and the mixture is then chilled at 5° C. for 20 minutes. The fine crystalline solid is collected by filtration, washed with cold water, and dried, yielding 14.42 grams of the S-methyl intermediate, N-2-(2-pyrimidyl)-N'-(S-methylisothioureido)formamidine, M.P. 148–50° C.

A suspension of 14.4 grams (0.069 mole) of the S-methyl intermediate in 70 ml. of 1 N sodium hydroxide solution contained in a 250 ml. Erlenmeyer flask is heated on a hot plate with stirring. The mixture is heated at the boiling point for one to two minutes until the deep yellow color disappears. The solution was then chilled; and the precipitate which forms is separated, washed with water, and dried. Recrystallization from 250 ml. of boiling water yields 4.4 grams of 3-amino-4-(2-pyrimidyl)-1,2,4-triazole, M.P. 258–60° C.

To a suspension of 3.9 grams (0.024 mole) of 3-amino-4-(2-pyrimidyl)-1,2,4-triazole in 80 ml. of pyridine (previously dried over calcium sulfate) in a 300 ml. three-necked flask (fitted with a stirrer, heating mantle, thermometer, stopper, and condenser capped by a calcium sulfate drying tube) there is added in one portion 5.9 g. (0.0252 mole) of acetylsulfanilyl chloride. The mixture is warmed with stirring to 60° C., and then slowly to 90° C., at which point solution of the triazole appears to occur. It is heated at approximately 90–95° C. for 2.5 hours. The mixture is then cooled, diluted with two volumes of water, and concentrated under reduced pressure. Five and one-quarter grams of a brown-yellow solid is collected in three crops. The solid has a melting point of approximately 248–55° C. Recrystallization of the crude material from a mixture of 200 ml. of methyl Cellosolve and 525 ml. of water yields 4.75 g. of 3-($N^4$-acetylsulfanilamido)-4-(2-pyrimidyl)-1,2,4-triazole, M.P. 251–55° C.

A suspension of 1.3 g. (0.00362 mole) 3-($N^4$-acetylsulfanilamido)-4-(2-pyrimidyl)-1,2,4-triazole in 150 ml. of 0.35 N ethanolic hydrogen chloride is heated at the boiling point for 1.5 hours. About 0.5 ml. of dimethylformamide is then added to promote solution and reflux is continued for 0.5 hour. The solvent is evaporated under reduced pressure and the residue is dissolved in cold water containing sufficient 0.1 N sodium hydroxide to adjust to approximately pH 5. The solution is then diluted to a volume of 100 ml. and chilled, resulting in crystallization of 0.33 g. of 3-sulfanilamido-4-(2-pyrimidyl)-1,2,4-triazole, M.P. 190–200° C. The crude material is recrystallized from methyl Cellosolve-water, bright yellow crystals of the purified product, M.P. 227–229° C.

EXAMPLE VIII

3-Sulfanilamido-4-(4,6-Dimethyl-2-Pyridyl)-1,2,4-Triazole

N - (4,6 - dimethyl - 2 - pyridyl) - N' - thioureido - formamidine, 4.46 g. (0.02 mole), (prepared by the method of Raison, supra) is suspended in 20 ml. of 2 N sodium hydroxide at 15–20° C. The mixture is stirred and treated in dropwise fashion with 2.52 g. (0.02 mole) of dimethyl sulfate. A suspension of yellow solid results, which is stirred at room temperature for 1 hour, and collected, yielding 4.2 g. (88%) of the yellow S-methylthioureido intermediate, M.P. 150–54° C. This material is then suspended in 42 ml. of 1 N-sodium hydroxide and heated until dissolved. The solution is then chilled rapidly and the intermediate 3-amino-4-(4,6-dimethyl-2-pyridyl)-1,2,4-triazole collected by filtration, yield 2.2 g. (58%), colorless needles, M.P. 250–53° C. The melting point is raised to 253–55° C. on recrystallization of this product from water.

The purified 1,2,4-triazole prepared as described in the previous paragraph, 1.9 g. (0.01 mole) is dissolved in 25 ml. of anhydrous pyridine and treated with 2.6 g. (0.011 mole) of N-acetyl sulfanilyl chloride by addition thereof to the solution during a period of 5 to 8 minutes. The reaction mixture is stirred at room temperature for one hour and then heated at 60–65° C. with stirring for 2 hours. An orange solution results which is chilled, diluted with 25 ml. of distilled water, and concentrated to a very small volume in vacuo. A further 25 ml. portion of water is added thereto, and again the solution is concentrated to a small volume in vacuo to assure removal of last traces of the pyridine solvent. The aqueous residue has a volume of about 10 to 15 ml. It is refrigerated and the resulting crude 3-($N^4$-acetylsulfanilamido) - 4 - (4,6 - dimethyl - 2 - pyridyl) - 1,2,4-triazole is collected by filtration. The material is triturated with boiling acetone and recrystallized from 50% aqueous dimethylformamide, yielding 1.2 g. of the purified N-acetyl intermediate, M.P. 266–68° C.

The $N^4$-acetyl compound is hydrolyzed by treatment thereof with 10 ml. of 2 N-sodium hydroxide on the steam bath for 2.5 hours. The reaction mixture is filtered while hot, cooled to room temperature, and poured with stirring into a mixture of 25 ml. of glacial acetic acid, 100 ml. of water, and 100 g. of crushed ice. The mixture is kept for 2 hours at 4° C. and the product collected, M.P. 242–49° C., yield 87%. Twice recrystallization from 50% aqueous dimethylformamide results in recovery of 87% of the crude material as tan, pure crystalline 3 - sulfanilamido - 4 - (4,6 - dimethyl - 2 - pyridyl)-1,2,4-triazole, M.P. 261–63° C.

While particular embodiments of this invention are shown above, it will be understood, of course, that the invention is not limited thereto, since many modifications may be made, and it is contemplated, therefore, by the appended claims, to cover any such modifications as fall within the true spirit and scope of this invention.

The elemental compositions, except for oxygen, of the 3 - sulfanilamido - 4 - substituted - 1,2,4 - triazoles described above were measured by standard microanalytical techniques. The values obtained and the wave lengths of principal infra red absorption maxima are arranged in the following table.

PHYSICAL PROPERTIES

| Compound | Example | Percent carbon | Percent hydrogen | Percent nitrogen | Percent sulfur | Absorption Maxima [1] |
|---|---|---|---|---|---|---|
| 3-sulfanilamido-4-phenyl-1,2,4-triazole | I | 52.88 | 4.19 | 22.03 | 10.06 | 2.90, 3.00, 3.10, 6.10, 6.20, 6.25, 6.65, 8.75, 9.10, 10.95, 13.10, 14.10μ. |
| 3-sulfanilamido-4-(2,5-dimethoxyphenyl)-1,2,4-triazole | II | 50.84 | 4.76 | 18.72 | 8.33 | 2.95, 3.00, 3.10, 6.10, 6.20, 6.30, 6.55, 8.75, 9.15, 10.90, 13.20μ |
| 3-sulfanilamido-4-(2-pyridyl)-1,2,4-triazole | III | 49.08 | 4.12 | 26.28 | 10.33 | 2.95, 3.00, 3.10, 6.10, 6.20, 6.30, 6.65, 8.80, 9.10, 10.95, 13.05, 14.10μ. |
| 3-sulfanilamido-4-(3-pyridyl)-1,2,4-triazole | IV | 49.12 | 3.79 | 25.59 | 10.17 | 2.95, 3.00, 3.10, 6.10, 6.20, 6.30, 6.65, 8.80, 9.10, 11.00, 13.05, 14.00μ. |
| 3-sulfanilamido-4-(4-pyridyl)-1,2,4-triazole | V | 49.13 | 4.33 | 26.50 | 9.91 | 2.85, 2.95, 3.10, 6.20, 6.65, 8.75, 9.10, 11.10, 13.10, 14.00μ |
| 3-sulfanilamido-4-(5-methyl-2-pyridyl)-1,2,4-triazole | VI | 51.18 | 4.52 | 25.42 | 9.80 | 2.95, 3.00, 3.10, 6.20, 6.25, 6.65, 8.80, 9.15, 11.00, 13.45μ. |
| 3-sulfanilamido-4-(4,6-dimethyl-2-pyridyl)-1,2,4-triazole | VIII | 52.48 | 4.78 | 24.25 | 9.31 | 2.95, 3.00, 3.10, 6.15, 6.20, 6.40, 6.65, 8.80, 9.20, 11.05, 13.60, 14.20μ. |

[1] Infra red absorption measurements made on pellets of the solid samples diluted to 0.5% concentration with potassium bromide.

What is claimed is:

1. The compound having the following formula:

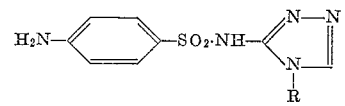

wherein R is selected from the group consisting of phenyl, lower alkoxyphenyl, pyridyl, lower alkyl pyridyl, and pyrimidyl.

2. 3 - sulfanilamido - 4 - (4,6 - dimethyl - 2 - pyridyl)-1,2,4-triazole.
3. 3-sulfanilamido-4-phenyl-1,2,4-triazole.
4. 3 - sulfanilamido - 4 - (2,5 - dimethoxyphenyl)-1,2,4-triazole.
5. 3-sulfanilamido-4-(α-pyridyl)-1,2,4-triazole.
6. 3-sulfanilamido-4-(β-pyridyl)-1,2,4-triazole.
7. 3-sulfanilamido-4-(γ-pyridyl)-1,2,4-triazole.
8. 3 - sulfanilamido - 4 - (5 - methyl - 2 - pyridyl)-1,2,4-triazole.
9. 3-sulfanilamido-4-(2-pyrimidyl)-1,2,4-triazole.

References Cited in the file of this patent

UNITED STATES PATENTS 2,494,524   Sprague   Jan. 10, 1950
2,540,356   Sprague   Feb. 6, 1951

OTHER REFERENCES

Anderson et al.: Jour. Am. Chem. Soc., vol. 64, pp. 2902–05 (1942).